(12) United States Patent
Fischer et al.

(10) Patent No.: US 8,668,462 B2
(45) Date of Patent: Mar. 11, 2014

(54) WIND TURBINE ROTOR BLADE

(75) Inventors: Gunter Fischer, Hamburg (DE);
Hermann Rochholz, Norderstedt (DE)

(73) Assignee: Nordex Energy GmbH, Norderstedt (DE)

( * ) Notice: Subject to any disclaimer, the term of this patent is extended or adjusted under 35 U.S.C. 154(b) by 751 days.

(21) Appl. No.: 12/833,085

(22) Filed: Jul. 9, 2010

(65) Prior Publication Data
US 2011/0229332 A1     Sep. 22, 2011

(30) Foreign Application Priority Data
Mar. 18, 2010    (EP) .................................... 10002871

(51) Int. Cl.
*F03D 1/02*     (2006.01)
*F03D 1/06*     (2006.01)

(52) U.S. Cl.
USPC ...................................... 416/242; 416/DIG. 5

(58) Field of Classification Search
USPC .......... 416/223 R, 226, 228, 235, 236 R, 242, 416/243, DIG. 2, DIG. 5
See application file for complete search history.

(56) References Cited

U.S. PATENT DOCUMENTS

| | | | |
|---|---|---|---|
| 4,976,587 A | | 12/1990 | Johnston et al. |
| 5,474,425 A | * | 12/1995 | Lawlor ...................... 416/223 R |
| 5,562,420 A | * | 10/1996 | Tangler et al. ............. 416/223 R |
| 6,068,446 A | * | 5/2000 | Tangler et al. ............. 416/223 R |
| 2007/0036657 A1 | * | 2/2007 | Wobben ..................... 416/223 R |
| 2007/0297896 A1 | * | 12/2007 | Wobben ........................ 415/130 |
| 2008/0206055 A1 | * | 8/2008 | Godsk et al. ................... 416/147 |
| 2009/0074583 A1 | * | 3/2009 | Wobben ..................... 416/223 R |
| 2009/0202354 A1 | * | 8/2009 | Godsk et al. ............. 416/223 R |
| 2009/0274559 A1 | * | 11/2009 | Petsche et al. ............ 416/223 R |

FOREIGN PATENT DOCUMENTS

| | | | | |
|---|---|---|---|---|
| DE | 10 2006 017 897 A1 | | 10/2007 | |
| EP | 1 845 258 A1 | | 10/2007 | |
| EP | 1845258 | * | 10/2007 | ................ F03D 1/06 |
| EP | 2 138 714 A1 | | 12/2009 | |
| EP | 2 141 358 A1 | | 1/2010 | |
| WO | 02/08600 A1 | | 1/2002 | |
| WO | 2004/097215 A1 | | 11/2004 | |
| WO | 2007/071249 A1 | | 6/2007 | |
| WO | WO2007/138136 | * | 6/2007 | ................ F03D 7/02 |
| WO | 2007/118581 A1 | | 10/2007 | |
| WO | WO 2008/122545 A1 | * | 10/2008 | ................ F03D 1/06 |
| WO | 2010/013024 A2 | | 4/2010 | |

* cited by examiner

*Primary Examiner* — Nathaniel Wiehe
*Assistant Examiner* — Joshua R Beebe

(57) ABSTRACT

Wind turbine rotor blade with a blade tip, a blade root, a leading edge, a trailing edge, a pressure side, a suction side and a cross-section, which changes from the blade tip to the blade root, the longitudinal portion being arranged between the blade root and the middle of the rotor blade, has the following:
  a convex pressure side portion, which extends from the leading edge up to a pressure-side inflection point,
  a concave pressure side addition portion, which connects with the pressure-side inflection point with a continuous curvature and extends up to the trailing edge,
  a convex suction side portion, which extends from the leading edge up to a suction-side kink or inflection point, and
  a suction side addition portion, which extends from the suction side kink or inflection point up to the trailing edge.

15 Claims, 11 Drawing Sheets

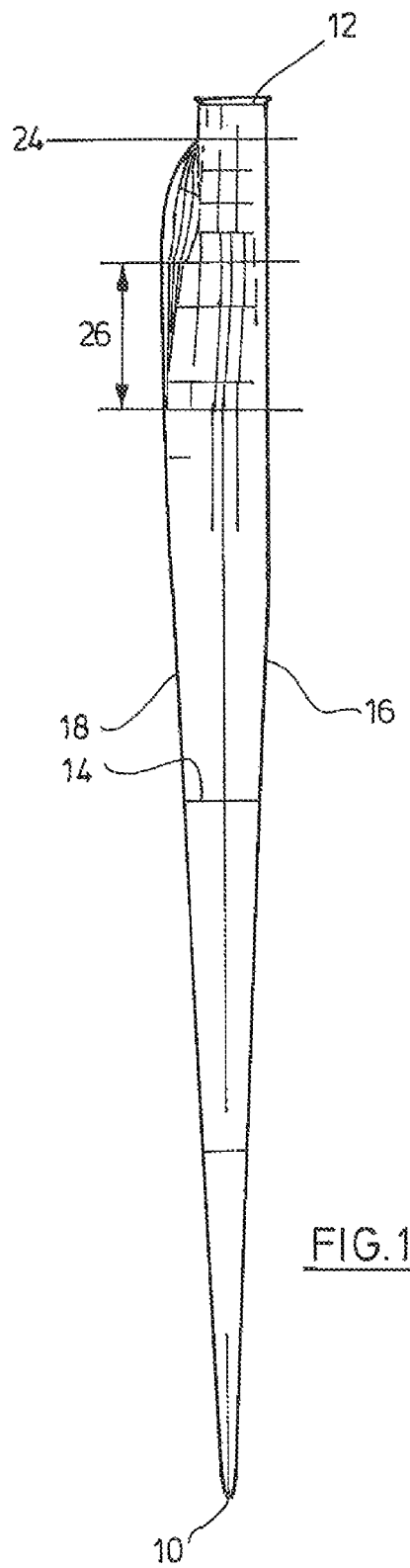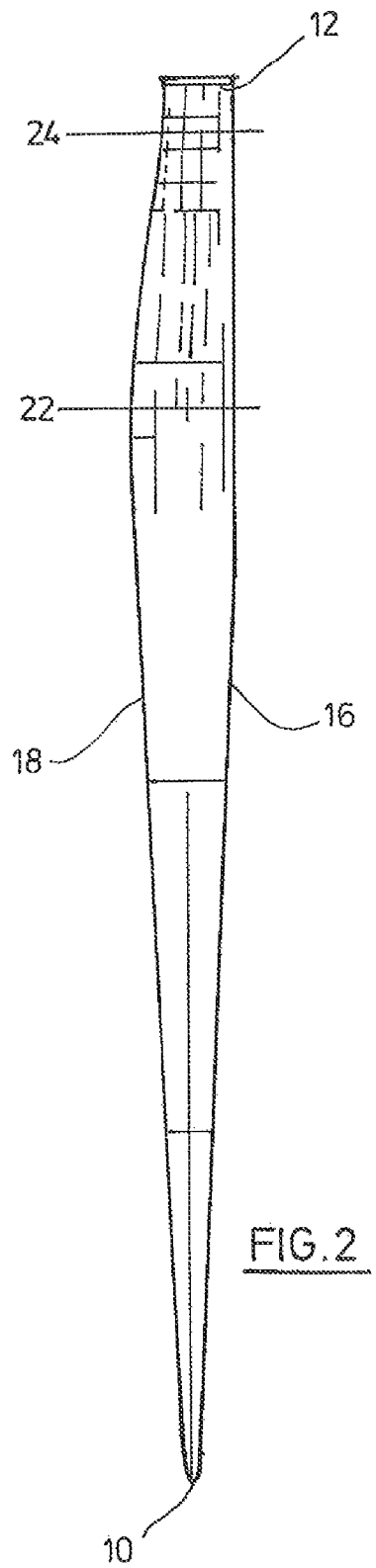

WIND TURBINE ROTOR BLADE

CROSS-REFERENCE TO RELATED APPLICATIONS

Figure 3:
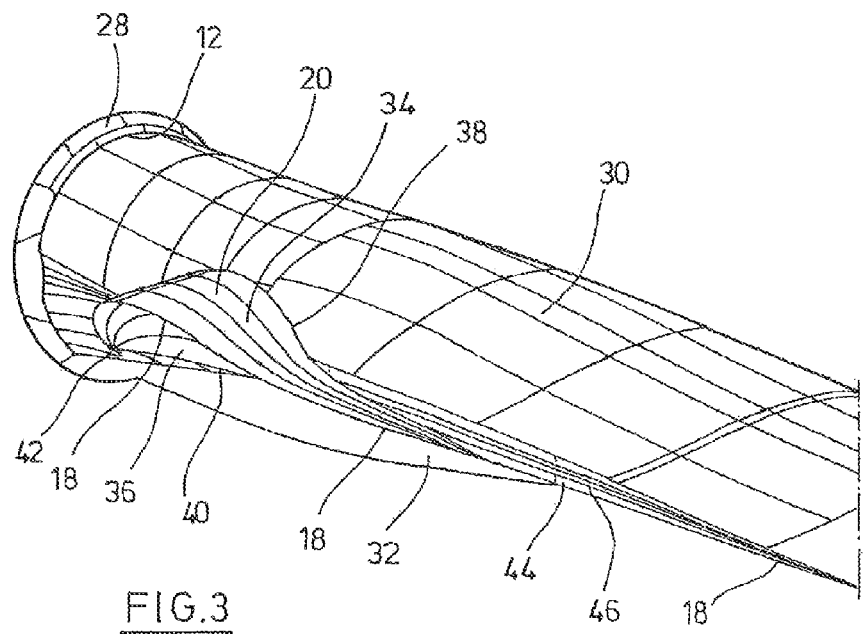

Not applicable.

STATEMENT REGARDING FEDERALLY SPONSORED RESEARCH

Not applicable.

BACKGROUND OF THE INVENTION

The invention relates to a wind turbine rotor blade comprising a blade tip, a blade root, a leading edge, a trailing edge, a pressure side, a suction side and a cross-section, which changes from the blade tip to the blade root, wherein the cross-section is formed by an aerodynamic profile in the middle of the rotor blade and is mainly circular at the blade root. Such rotor blades are used in particular for wind turbine systems with a two- or three-blade rotor with a horizontal axis. They are connected at their blade root to a hub of the rotor. An assembly flange can be designed at the blade root of the rotor blade and the pitch angle of the blade can be designed to be adjustable with the help of a pitch drive.

Known rotor blades represent a compromise between the optimal aerodynamic shape, the requirements of the strength design and the attempt to create an economical manufacturing technique. In particular, the relative thickness of the used aerodynamic profiles must be selected based on strength considerations. A relatively small blade thickness of less than 30% of the profile depth, frequently between 18% and 15% of the same, can be used in the aerodynamically particularly important outer area of the rotor blades. The inner area of the rotor blades, which lies closer to the hub, plays a less decisive roll aerodynamically so that more deviation from the aerodynamic optimum and a relatively large blade thickness can be accepted in order to achieve sufficient rigidity. The aerodynamic profile then merges into the mainly circular cross-section towards the blade root. In order to improve the aerodynamic performance of the rotor blades on the inside, different approaches are known from the state of the art.

The use of a fin-like attachment extending longitudinally along the trailing edge of the rotor blade is known from document WO 02/08600 A1, the entire contents of which is incorporated herein by reference. The attachment is primarily located in a cylindrical connection area of the rotor blade, which connects a rotor blade portion arranged further on the outside and provided with an aerodynamic profile with the hub. In this manner, the otherwise aerodynamically ineffective connection area also contributes to the performance of the rotor.

A rotor blade for a wind turbine with an attached device on the pressure side near the blade root is known from document DE 10 2006 017 897 B4, the entire contents of which is incorporated herein by reference. The known attached device extends mainly in the longitudinal direction of the rotor blade. A so-called attached-device flow surface of the known attached device begins on the pressure side at a point of the profile where a tangent applied to the profile runs at an angle ranging from −20° to +20° to the designed direction of flow. The attached-device flow surface runs approximately at the angle of this tangent up to a trailing edge of the attached device that is different from the rotor blade trailing edge, to which a rear surface of the attached device connects, which leads back to the pressure side of the profile. Comparable attached devices are also known from documents EP 2 138 714 A1, the entire contents of which is incorporated herein by reference and EP 2 141 358 A1, the entire contents of which is incorporated herein by reference.

A rotor blade of a wind turbine, which is specially designed for a gearless wind turbine, is known from document WO 2004/097215 A1, the entire contents of which is incorporated herein by reference. Such wind turbines have a hub with a relatively large diameter. In the case of this known rotor blade, the aerodynamic profile of the rotor blade is continued mainly up to the hub, which leads to a very large profile depth due to the large profile thickness near the hub required for reasons of rigidity. In order to achieve this, the rear area of the profile is formed by an attachment.

A wind turbine rotor blade is known from document EP 1 845 258 A1, the entire contents of which is incorporated herein by reference, the cross-section of which has a concave pressure side addition portion in a transition area between a circular blade root and an aerodynamic profile. The rear end of this pressure side addition portion is connected with the trailing edge via a straight portion, which is aligned perpendicular to the profile chord and also belongs to the pressure side. The suction side of the known rotor blade is formed by a convex portion between the leading edge and the trailing edge, which merges into the straight portion at the trailing edge forming an outward pointing kink.

BRIEF SUMMARY OF THE INVENTION

The object of the invention is to provide a wind turbine rotor blade, which can be easily produced and achieves improved performance, in particular at an inner zone of the rotor.

The wind turbine rotor blade according to the invention has a blade tip, a blade root, a leading edge, a trailing edge, a pressure side, a suction side and a cross-section, which changes from the blade tip to the blade root, wherein the cross-section is formed by an aerodynamic profile in the middle of the rotor blade and is mainly circular at the blade root. In a longitudinal portion of the rotor blade, the longitudinal portion being arranged between the blade root and the middle of the rotor blade, it has a cross-section, which comprises:
  a convex pressure side portion, which extends from the leading edge up to a pressure-side inflection point,
  a concave pressure side addition portion, which connects with the pressure-side inflection point in a continuous curvature and extends up to the trailing edge,
  a convexly curved suction side portion, which extends from the leading edge up to a suction-side kink or inflection point, and
  a suction side addition portion, which extends from the suction side kink or inflection point up to the trailing edge.

Like all wind turbine rotor blades, the rotor blade according to the invention is designed such that optimal power consumption from the wind is enabled in the case of a certain relation between the rotational speed at the blade tip and the wind speed, i.e. in the case of the so-called design tip speed ratio, and a specified pitch angle. When the rotor blade is operated at the design tip speed ratio, the air flows in a defined direction of flow at each longitudinal position of the rotor blade. This flow direction is in the following called the designed direction of flow. The trailing edge of the rotor blade is the edge of the rotor blade located furthest back in the designed direction of flow. As a rule, on the trailing edge, the suction and pressure sides converge in an acute angle. In the case of rotor blades with a so-called "thick trailing edge," a linear portion, which is mainly arranged perpendicular to the designed direction of flow and forms a rear surface of the rotor blade, is located at the back of the profile. By definition in this case, the trailing edge of the rotor blade is formed by the center points of the linear portions forming the "thick trailing edge." The leading edge of the rotor blade is the leading edge of the rotor blade furthest apart from the trailing edge. To be distinguished from the leading edge is that point in the front area of the rotor blade at which the inflowing air is separated into one air current flowing along the pressure side and one flowing along the suction side. This is the stagnation point. In contrast to the position of the leading edge, the location of the stagnation point depends on the operating conditions of the rotor blade, in particular on the pitch angle. The blade root is mainly circular and can be provided with an assembly flange for fastening on a rotor hub. The pressure side is the surface located between the leading and trailing edge of the rotor blade, on which excess pressure is created during operation as a rule. Accordingly, the suction side is the surface of the rotor blade between the leading edge and trailing edge, on which negative pressure is created during operation as a rule. The longitudinal axis of the rotor blade is defined as a straight line through the center point of the circular cross-section at the blade root, which is aligned perpendicular to this circular cross-section.

The aerodynamic profile in the middle of the rotor blade is generally equal to a wing profile of an airplane. As a rule, it has a convex suction side, a front, convex pressure side portion and a rear, also convex or concave, pressure side portion. As a rule, the two named pressure side portions merge with a continuous curvature, i.e. without a kink, where the direction of a tangent changes discontinuously.

In a longitudinal portion of the rotor blade between the blade root and the middle of the rotor blade, the rotor blade has a cross-section deviating from a conventional aerodynamic profile. This is clarified by the terms "pressure side addition portion" and "suction side addition portion." In other words, these portions represent extensions of the pressure or respectively suction side of a conventional profile. Besides this, the named terms as such are given no restricting meaning.

The aerodynamic performance in the area of the longitudinal portion is in particular improved by the convex pressure side addition portion, which amplifies the excess pressure building on the pressure side in the rear area of the cross-section. This effect is technically known as "rear loading." The concave pressure side addition portion connects with a continuous curvature to the convex pressure side portion so that there are no flow separations in the connection area.

In contrast to the pressure side addition portion, the suction side addition portion does not necessarily merge with a continuous curvature into the suction side portion located in front, which is convexly curved. Rather, a kink or inflection point is located between the convexly curved suction side portion and the suction side addition portion. If one follows the progression of the convexly curved suction side portion from the leading edge up to this kink or inflection point, there is always an inward pointing curvature, i.e. a curvature applied to the curve is always located on the side of the suction side portion pointing towards the inside of the profile. At the kink or inflection point, this curvature changes its leading sign in the case of an inflection point and first runs in the opposite direction to the outside. In the case of a kink point, the direction of a tangent applied to the curve also changes, namely discontinuously, wherein the curve kinks outward at the kink point. The edge formed by the kink points of successive cross-sections points inward. In both cases, the direction of the curve at the kink or inflection point changes with respect to the cross-section towards the outside.

The kink or inflection point can be located at approximately the same distance from the leading edge as the pressure side inflection point. It has been shown that even a kink point in the cross-section of the aerodynamic performance of the profile is not detrimental, which is due to the fact that in the case of relative profile thicknesses on the order of magnitude considered here there are flow separations on the suction side as a rule even in the case of a continuously curving surface progression. In some cases, these can also occur in the cross-section designed according to the invention. However, a particularly material-saving construction of the rotor blade can be achieved through the kink or inflection point on the suction side of the profile.

In one embodiment, the distance between the pressure side inflection point and the leading edge, measured along the profile chord, is more than 60% of the profile depth. The transition from the convex pressure side portion to the concave pressure side addition portion is thus located relatively far to the back, clearly behind the location of the maximum thickness of the profile. It was shown that the transition can also take place at an even greater distance from the leading edge of for example 65%, 70% or even 80% of the profile depth, without there being flow separations. The named distances from the leading edge refer respectively to a measurement along the profile chord, i.e. to the projection of the spatial distance in this direction. The profile chord is a straight line connecting the leading and trailing edges of the profile.

In one embodiment, the suction side addition portion is mainly straight. The arrangement and shape of the concave pressure side addition portion and the arrangement of the trailing edge are significant for the aerodynamic effect of the profile. The suction-side connection of the trailing edge to the convex suction side portion is of lesser significance aerodynamically due to the already discussed flow separations in this area. A straight-line shape of the suction side addition portion is particularly easy to produce and is also advantageous for strength considerations.

In one embodiment, a tangent against the pressure side addition portion at the trailing edge will lie mainly in the direction of the rotor plane if the rotor blade has a pitch angle optimized for partial load operation. The rotor plane is mainly the plane covered by the rotor blade during rotation around the rotor axis. Strictly speaking, this observation only applies in the case of a rotor blade arranged perpendicular to the rotor axis. In practice, the longitudinal axis of the rotor blade can also be tilted slightly with respect to this vertical line towards the rotor axis so that the rotor blade does not rotate in a plane but rather on a cone. However, whenever "rotor plane" is referred to here and below, this means, the plane that includes the longitudinal axis of the rotor blade in the current rotational position of the rotor blade and a second direction, which is arranged perpendicular to the longitudinal axis of the rotor blade and perpendicular to the rotor axis. The pitch angle optimized for the partial load operation is the pitch angle, at which the rotor blade is preferably operated in partial load operation. It leads to optimal power consumption from the wind, in particular at the design tip speed ratio. With increasing wind speed, the consumed power increases in partial load operation. When maximum power is reached, the power can no longer be increased. If the wind speed continues to increase, a degradation of the aerodynamic efficiency thus is obtained by increasing the pitch angle. A regulation of the power by controlling the pitch angle can be performed and the system is in so-called pitch-regulated operation or full load operation. The pitch angle optimized for partial load operation is a clearly defined variable, which is taken into consideration in the design of the rotor blade. The named alignment of the tangent towards the pressure side portion has the fact that the air flowing around the rotor blade on the pressure side at the trailing edge mainly flows in the direction of the rotor plane. The rotor blade thereby delivers an optimal torque contribution in the area of the profile according to the invention.

In one embodiment, a tangent lies against the suction side addition portion at the trailing edge mainly in the rotor plane when the rotor blade has a pitch angle optimized for partial load operation. This arrangement also contributes to an optimal torque because the air flowing on the suction side around the rotor blade also mainly flows in the direction of the rotor plane. In particular in connection with a straight-line suction side addition portion, i.e. in the case of a suction side addition portion located entirely in the rotor blade plane in partial load operation, this applies according to model calculations also considerating the flow separations because the formation of a separation region with almost even thickness frequently occurs above the suction side addition portion. This swirling air is separated by a dividing streamline from the laminar air flow at a greater distance from the suction side addition portion. If the suction side addition portion and thus also the dividing streamline progress close to the rotor plane, the laminar air flow on the distant side of the dividing streamline mainly in the direction of the rotor plane, which increases the created torque.

In one embodiment, an acute angle is formed between the pressure side addition portion and the suction side addition portion at the trailing edge. This benefits a smooth flowing of the air at the trailing edge in accordance with the Kutta condition.

In accordance with one embodiment, the longitudinal portion begins at a distance from the blade root. For example, there can be a distance of 0.5 m, 1.0 m or more between the blade root and the longitudinal portion. Within this distance area, the cross-section of the rotor blade can be circular like at the blade root. A portion arranged near the blade root, where the profile is not yet designed as in the longitudinal portion, simplifies the transport and the assembly of the rotor blade. For example, a belt can be placed around this portion without damaging the special profile in the longitudinal portion.

In one embodiment, the longitudinal portion extends up to a distance from the blade root, at which the cross-section has a relative profile thickness of 60% or less. It can also extend up to a cross-section with a relative profile thickness of 55%, 50%, 45% or 40%, so that the improved "rear loading" is achieved in a larger longitudinal portion. In the area of even smaller relative profile thickness, the profile according to the invention is less suitable in contrast because aerodynamically good or better results can be achieved with a conventional profile without leading to excessive profile depths or very high production effort.

In one embodiment, the longitudinal portion extends up to a distance from the blade root of 10% or more of the rotor blade length. The longitudinal portion can also extend up to a greater distance from the blade root of for example 15%, 20%, 25% or even 30% of the rotor blade length so that the advantages of the invention can be obtained in a larger longitudinal portion.

In one embodiment, the rotor blade has a constant profile depth between a first distance of 10% of the rotor blade length from the blade root and a second distance of 15% of the rotor blade length from the blade root. The constant profile depth can in particular be a maximum profile depth, which cannot easily be exceeded due to production and transport conditions. Through the cross-sectional geometry according to the invention in this longitudinal area it is possible to improve the aerodynamic properties without exceeding the maximum profile depth. At the same time, the maximum profile depth in the named distance area is utilized optimally.

In one embodiment, the pressure side addition portion and the suction side addition portion are formed by an attachment, which is connected with the remaining components of the rotor blade. The remaining components of the rotor blade can in particular be the components of a conventional rotor blade, which is equipped with the attachment after completion. The attachment can for example be screwed and/or glued to the remaining components. Rotor blades of existing wind turbines can thereby easily be equipped with a longitudinal portion according to the invention.

In one embodiment, the remaining components of the rotor blade at a longitudinal position of the rotor blade have a maximum profile depth, wherein the attachment begins at this longitudinal position and extends from there in the direction of the blade root. The longitudinal area with the maximum profile depth of a conventional rotor blade denotes that point where the transition from an aerodynamically optimal profile to the circular cross-section at the blade root begins. The attachment can thus particularly advantageously start from this point.

In one embodiment, the remaining components of the rotor blade at a longitudinal position of the rotor blade have a maximum profile depth, wherein the attachment begins at a greater distance from the blade root than this longitudinal position and extends from there in the direction of the blade root, and the profile depth of the rotor blade is enlarged through the attachment at least in a longitudinal portion above and beyond the maximum profile depth of the remaining components. The maximum profile depth of the remaining components of the rotor blade can be defined for example by restricting transport or production conditions. If an attachment is added to these remaining components after transport or respectively after production, the maximum profile depth can in some cases thereby be exceeded without or with little additional effort. A larger profile depth can thereby be used with the help of the attachment in the longitudinal portion.

In one embodiment, the attachment is subdivided into several segments. It is thus easier to handle and assemble. The segments can in particular be strung together in the longitudinal direction of the rotor blade, wherein a distance that enables a relative movement between the segments can be located between two segments. The distance can for example be filled with an elastic adhesive. The connection of the attachment with the remaining components of the rotor blade is thereby less heavily stressed, in particular in the case of a deformation of these remaining components when loaded.

In one embodiment, the attachment is shell-like, i.e. it is made of a curved jacket with a mainly even thickness. One side of the jacket forms the pressure side addition portion, the opposite-lying side of the jacket the suction side addition portion. The jacket is connected with the remaining components of the rotor blade such that the pressure side is continued in a continuously curved manner by the pressure side addition portion. This embodiment is particularly easy to implement from a structural point of view.

BRIEF DESCRIPTION OF THE SEVERAL
VIEWS OF THE DRAWINGS

The invention is explained in greater detail below based on exemplary embodiments shown in the figures.

Figure 4:
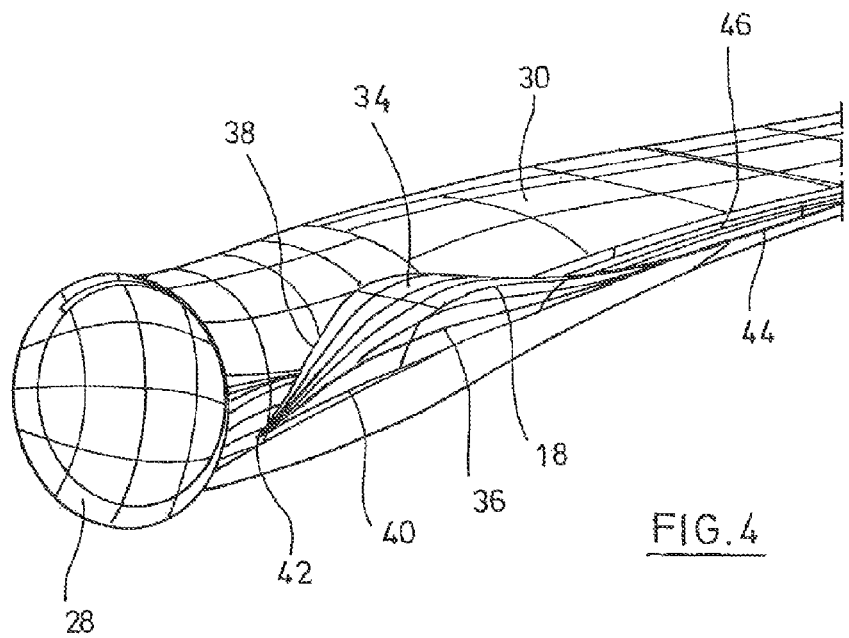
Figure 5:
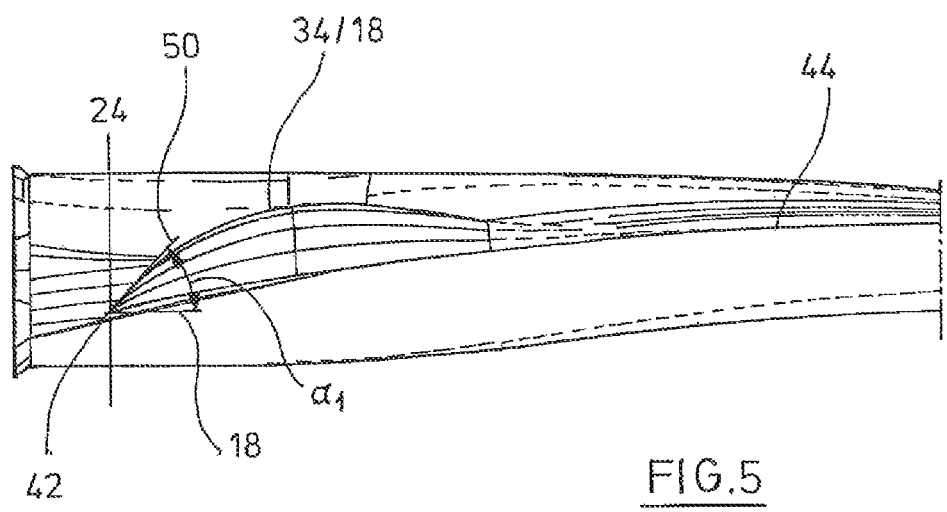
Figure 6:
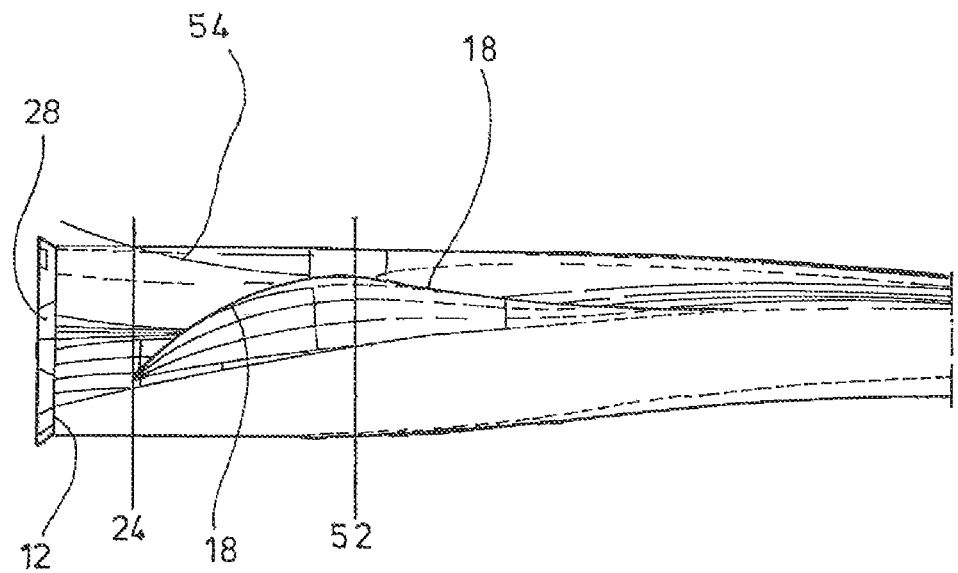
Figure 7:
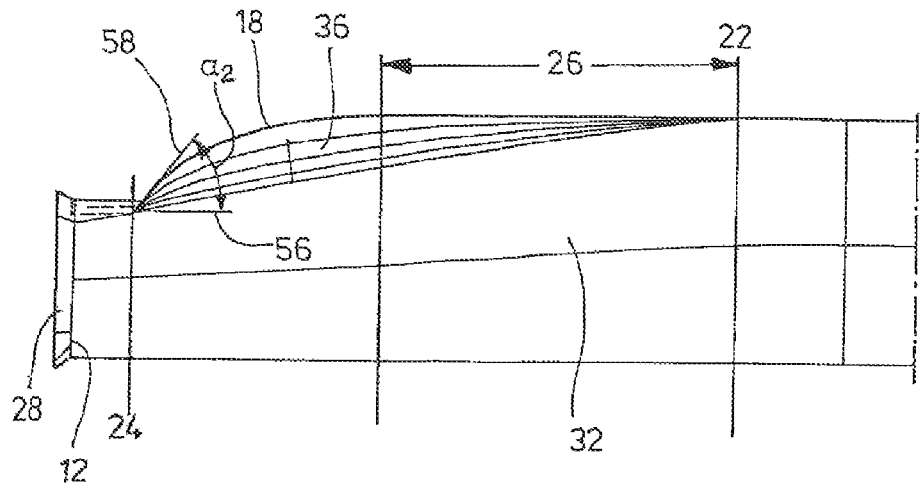
Figure 8:
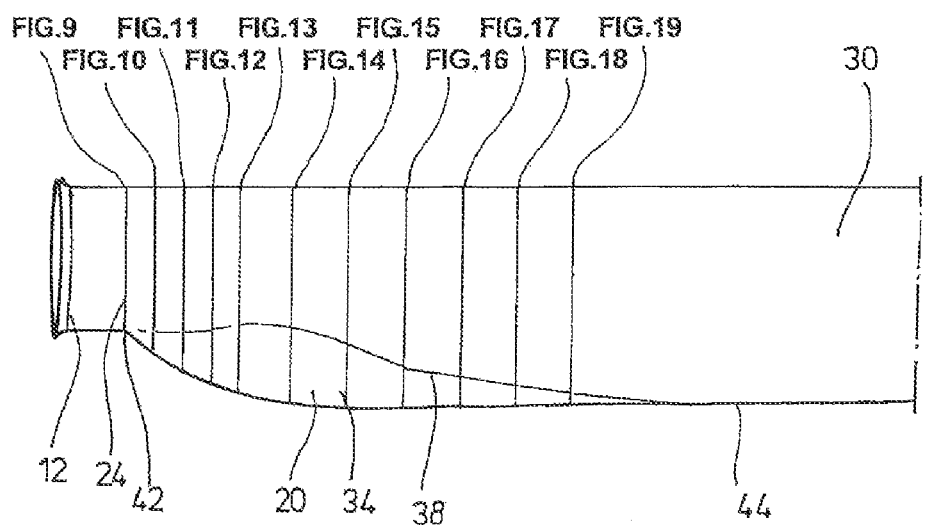
Figure 9:
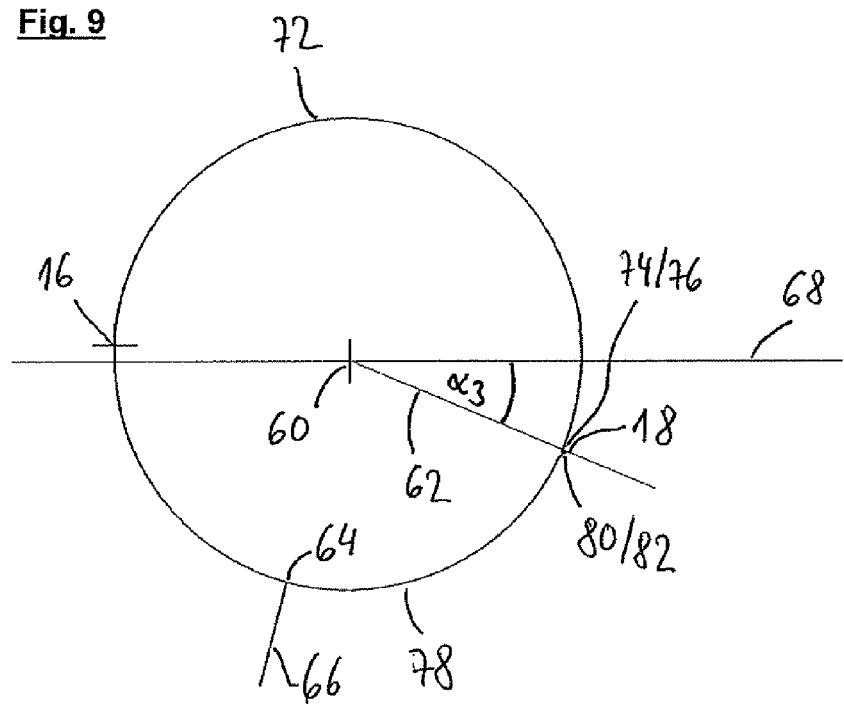
Figure 10:
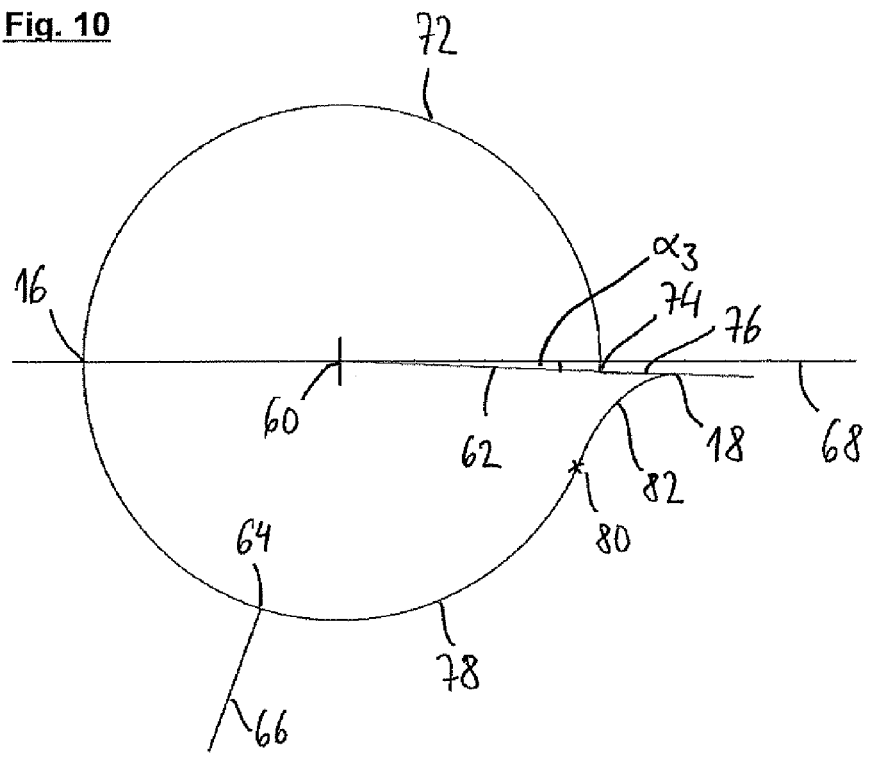
Figure 11:
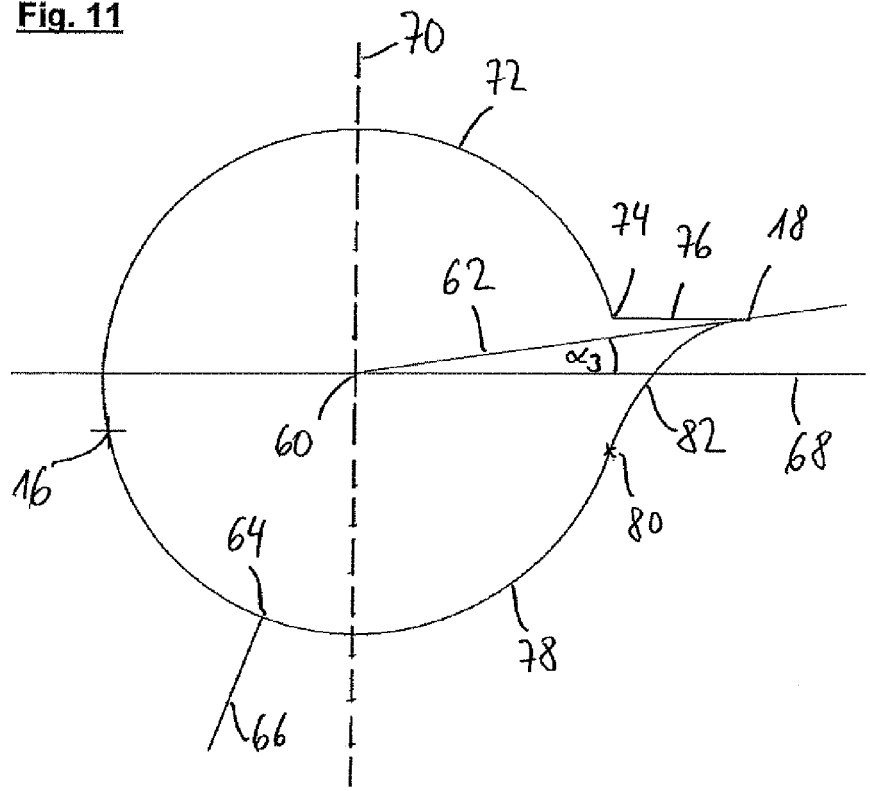
Figure 12:
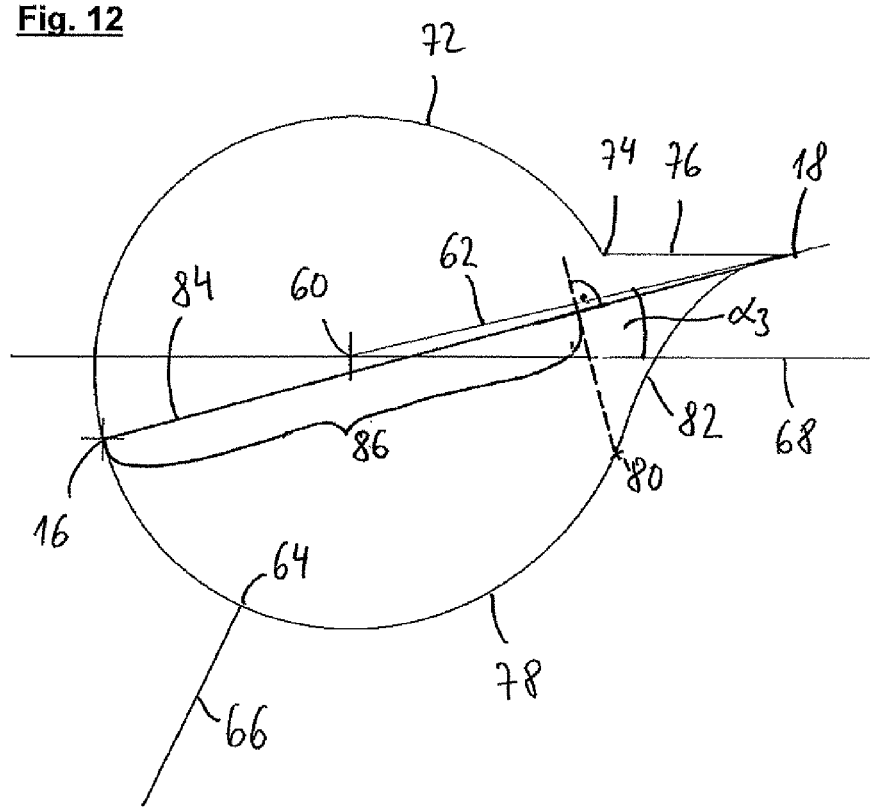
Figure 13:
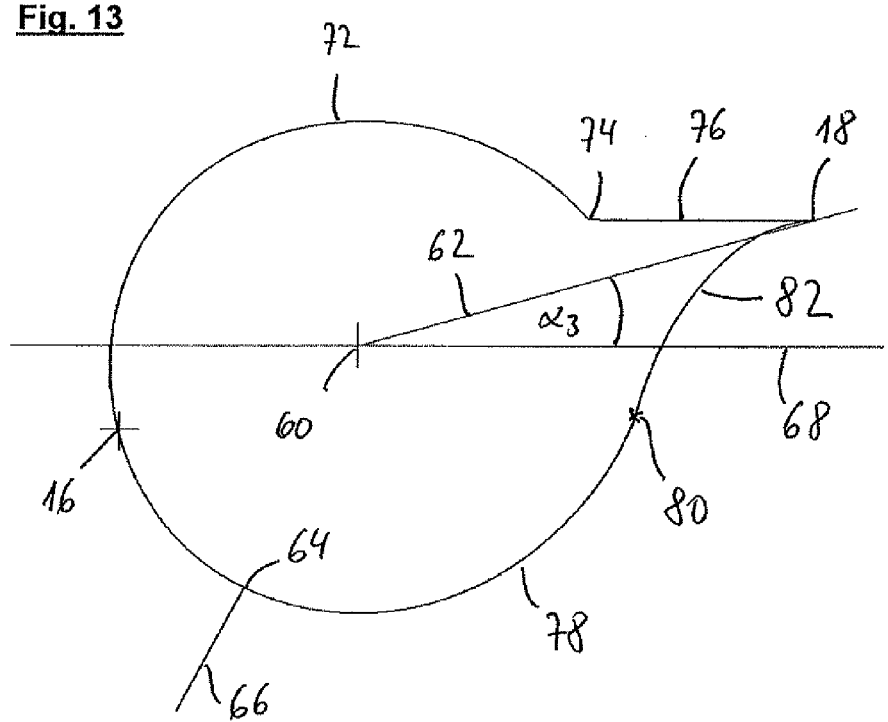
Figure 14:
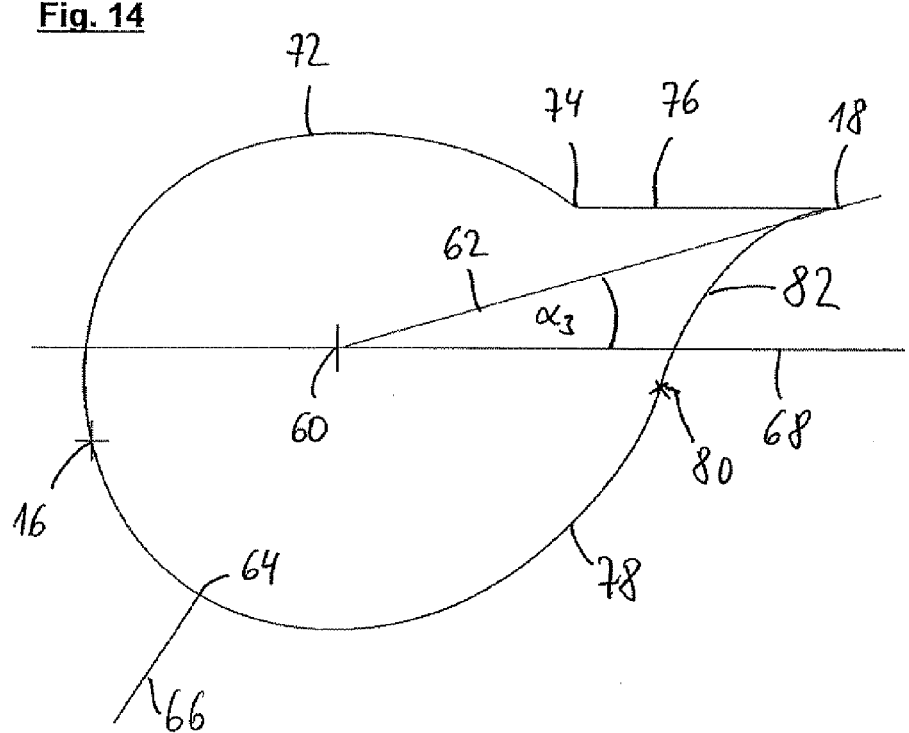
Figure 15:
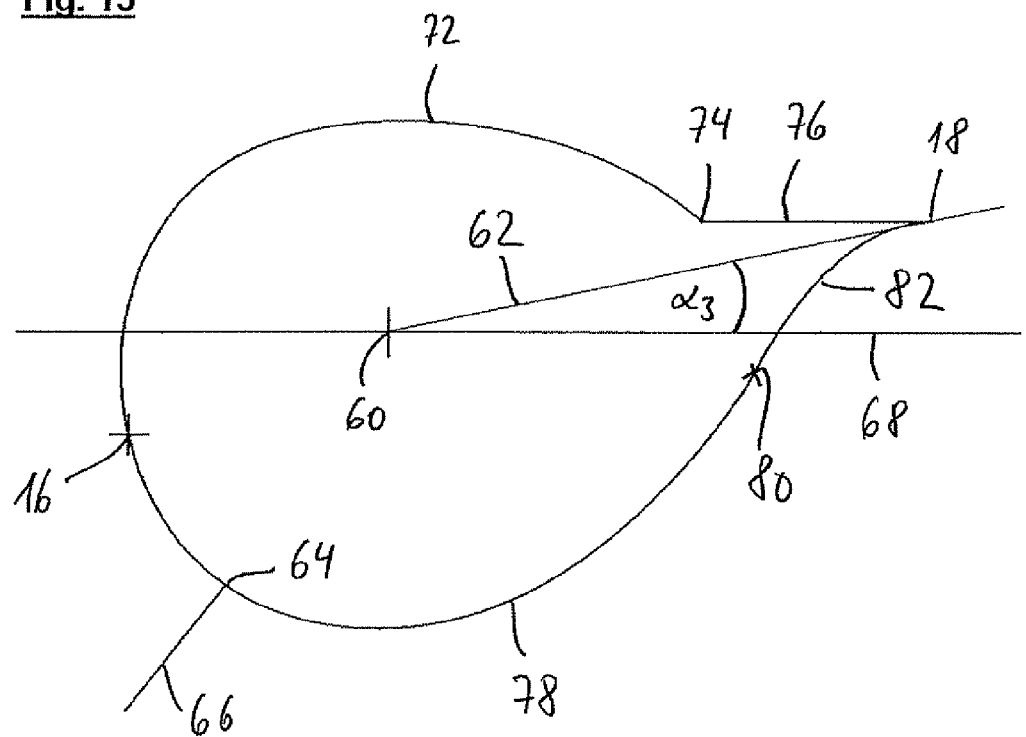
Figure 16:
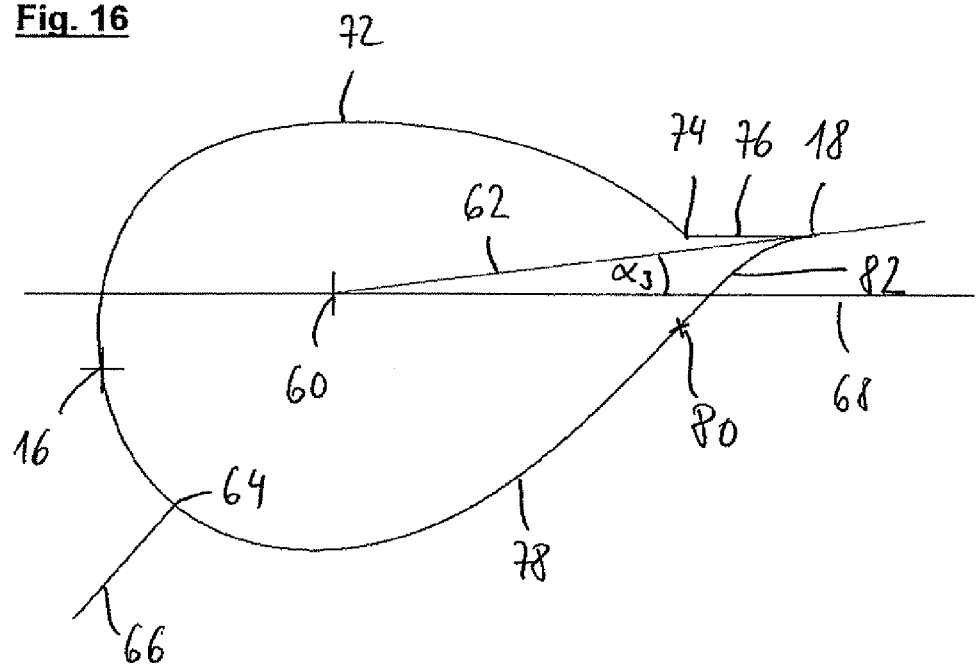
Figure 17:
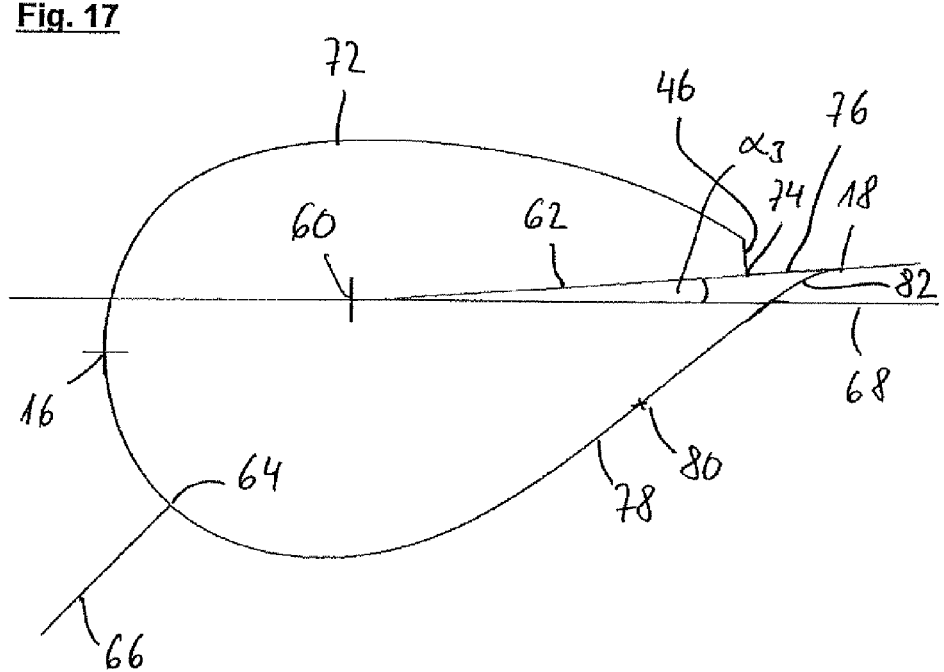
Figure 18:
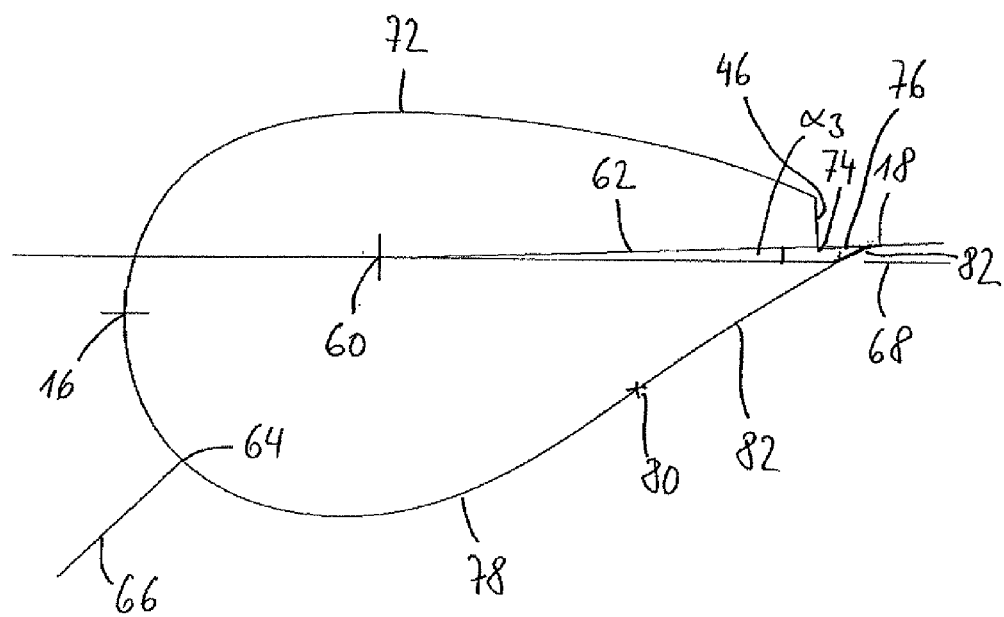
Figure 19:
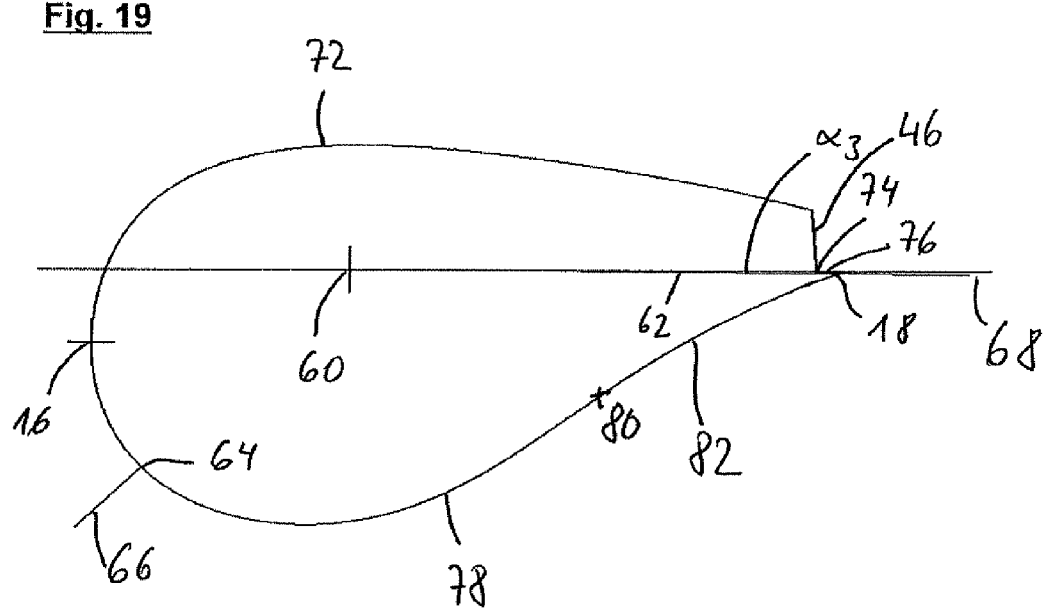
Figure 20:
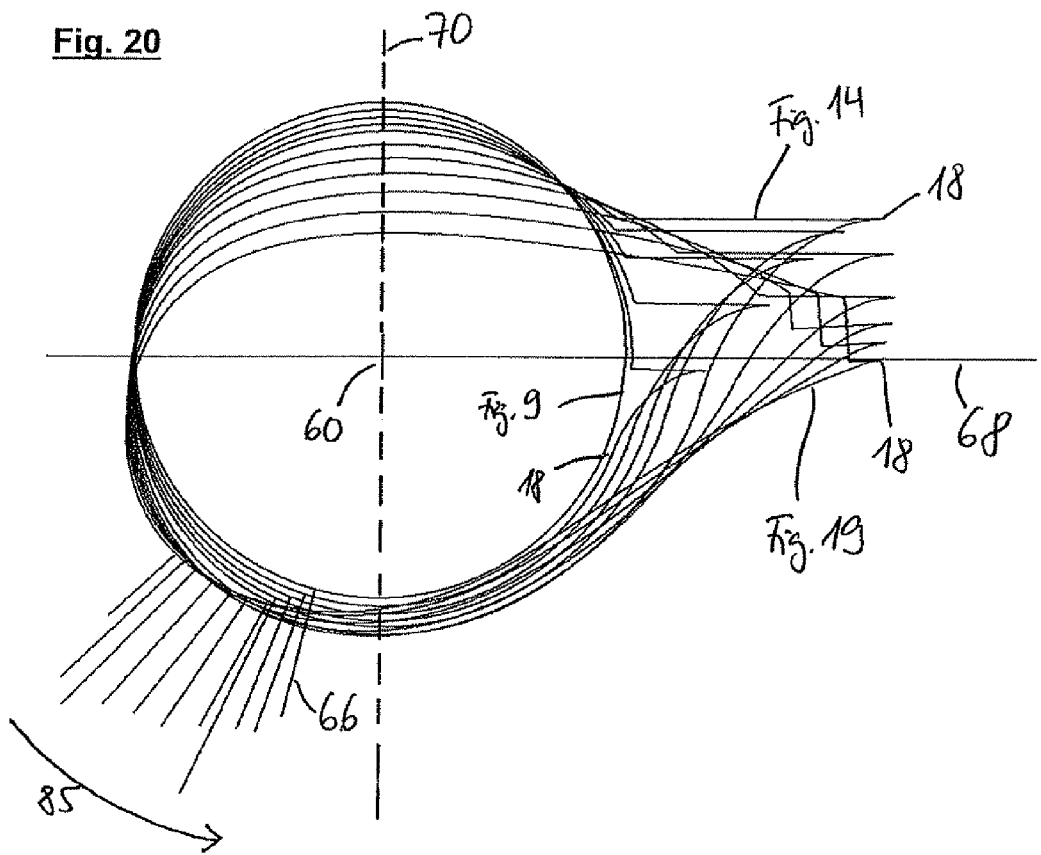
Figure 21:
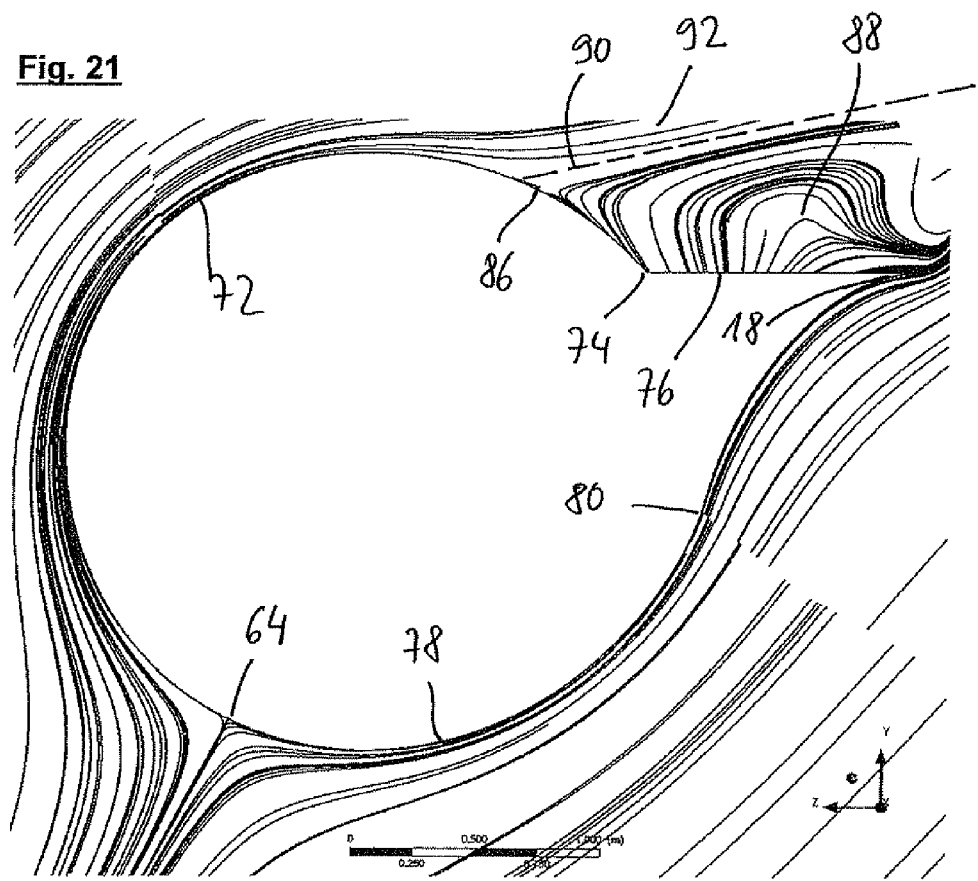
Figure 22:
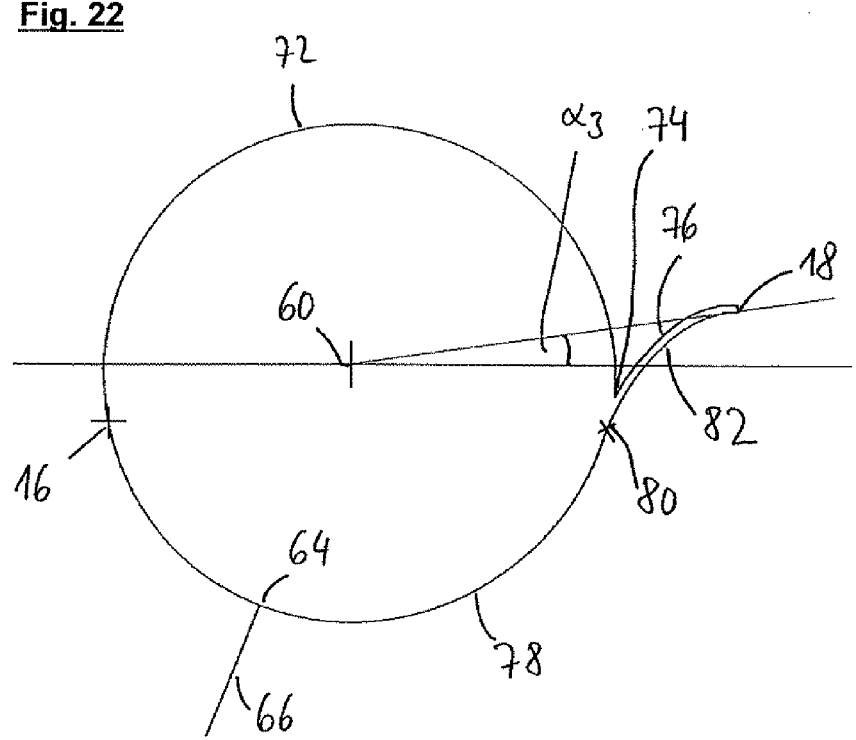

FIG. 1 a top view of the suction side of a rotor blade according to the invention, FIG. 2 a top view of the suction side of a conventional rotor blade according to the prior art, FIG. 3 a perspective view of a portion of the rotor blade from FIG. 1, FIG. 4 another perspective view of a portion of the rotor blade from FIG. 1, FIG. 5 a top view of the trailing edge of a portion of the rotor blade from FIG. 1, FIG. 6 a top view according to FIG. 5 with additional highlighting, FIG. 7 a top view of the pressure side of a portion of the rotor blade from FIG. 1, FIG. 8 a top view of the suction side of a portion of the rotor blade from FIG. 1, FIG. 9 a cross-section through the rotor blade from FIG. 1 in a cross-sectional plane located 2 meters from the rotor axis, FIG. 10 a cross-section through the rotor blade from FIG. 1 in a cross-sectional plane located 2.5 meters from the rotor axis, FIG. 11 a cross-section through the rotor blade from FIG. 1 in a cross-sectional plane located 3 meters from the rotor axis, FIG. 12 a cross-section through the rotor blade from FIG. 1 in a cross-sectional plane located 3.5 meters from the rotor axis, FIG. 13 a cross-section through the rotor blade from FIG. 1 in a cross-sectional plane located 4 meters from the rotor axis, FIG. 14 a cross-section through the rotor blade from FIG. 1 in a cross-sectional plane located 5 meters from the rotor axis, FIG. 15 a cross-section through the rotor blade from FIG. 1 in a cross-sectional plane located 6 meters from the rotor axis, FIG. 16 a cross-section through the rotor blade from FIG. 1 in a cross-sectional plane located 7 meters from the rotor axis, FIG. 17 a cross-section through the rotor blade from FIG. 1 in a cross-sectional plane located 8 meters from the rotor axis, FIG. 18 a cross-section through the rotor blade from FIG. 1 in a cross-sectional plane located 9 meters from the rotor axis, FIG. 19 a cross-section through the rotor blade from FIG. 1 in a cross-sectional plane located 10 meters from the rotor axis, FIG. 20 the cross-sections from FIGS. 9 through 19 in a joint representation, FIG. 21 a representation of the flow lines in a cross-sectional plane through the rotor blade in accordance with FIG. 13, and FIG. 22 a cross-section through another exemplary embodiment of a rotor blade according to the invention with a shell-like attachment.

The same reference numerals are used for the same parts in all figures.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

In FIG. 1, the entire rotor blade is shown in a top view of the suction side. It has a length of just under 50 meters from the blade tip 10 to the blade root 12. At the blade root 12, the rotor blade has a circular cross-section. The blade root 12 has a circular assembly flange not shown in the figures, which is mounted to the rotor hub. The blade root 12 is then located at a distance of approximately 1.5 m from the rotor axis.

Over the bulk of its length, the rotor blade has an aerodynamic profile in cross-section, in particular in the middle 14 of the rotor blade. The leading edge 16 of the rotor blade is located in the representation in FIG. 1 mainly on the right edge of the shown rotor blade; the trailing edge 18 is formed by the left edge of the rotor blade.

In a longitudinal portion of the rotor blade, an attachment 20 is arranged, which forms the trailing edge 18 in this longitudinal portion. The shape of the attachment 20 is described in detail below.

FIG. 2 shows a conventional rotor blade according to the prior art, which can be fitted with an attachment 20 to create a rotor blade according to the invention in accordance with FIG. 1. Insofar as the invention is achieved through the connection of the attachment 20 with a conventional rotor blade, for example in accordance with FIG. 2, the conventional rotor blade in the language usage of this application forms the other or remaining components of the rotor blade. The attachment 20 can for example be glued to and/or screwed in these other components.

A comparison of FIGS. 1 and 2 shows that the rotor blade according to the invention with attachment 20 in accordance with FIG. 1 differs from the conventional rotor blade in accordance with FIG. 2 among other things in the progression of its profile depth. In a conventional rotor blade in accordance with FIG. 2, the profile depth first increases in a monotonic manner beginning from the blade tip 10 in the direction of the blade root 12 until a maximum profile depth is reached at the longitudinal position designated 22. Beginning from the longitudinal position 22, the profile depth decreases again towards the blade root 12, wherein the aerodynamic profile merges into the circular cross-section, which it also has in the area of the blade root 12, at a third cross-section designated 24. The transition of the profile depth takes place continuously along a continuously differentiable curve. In the invention in accordance with FIG. 1, the profile depth from the blade tip 10 to the longitudinal position 22 with maximum profile depth has the same progression as in FIG. 2. However, from the longitudinal position 22 to the blade root, the profile depth first remains constant in the longitudinal portion 26 in order to then decrease to the circular cross-section. The transition from the aerodynamic profile to the circular cross-section takes place in turn at the third cross-section 24, wherein the profile depth at this position changes upon formation of a kink. The curve describing the trailing edge 18 is thus not continuously differentiable at this point.

The longitudinal portion 26 with a constant profile depth extends approximately over an area between a first distance of 10% of the rotor blade length from the blade root and a second distance of approximately 20% of the rotor blade length of the blade root.

In the perspective view of FIG. 3, the shape of the attachment can be identified more exactly. The shown portion of the rotor blade begins at the blade root 12 and shows approximately the blade-root-side third of the rotor blade. Like FIGS. 4 through 8, the representation originates from an aerodynamic model calculation, in which the hub of the rotor is represented by a sphere 28. A part of this sphere 28 is also shown in FIGS. 3 through 8, but does not belong to the rotor blade. One can see the circular cross-section of the rotor blade in FIG. 3 in the area of the blade root 12 and can sense the aerodynamic profile of the rotor blade, which mainly corresponds with that of an airplane bearing surface, on the right edge of the figure. The side of the rotor blade located on top in the representation is the suction side 30; the pressure side 32 is located on the bottom side and is only partially visible in FIG. 3.

A part of the suction side 30 and a part of the pressure side 32 are formed by the attachment 20. For this, the attachment 20 comprises a single convexly curved suction side addition portion 34 and a double concavely curved pressure side addition portion 36. The suction side addition portion 34 and the pressure side addition portion 36 run together at the trailing edge 18 by forming an acute angle. The suction side addition portion 34 merges into the parts of the suction side 30 formed by the remaining components of the rotor blade at a curved line 38. The pressure side addition portion 36 merges into the parts of the pressure side 32 formed by the remaining components of the rotor blade at another curved line 40.

As seen from the blade root 12, the attachment 20 begins at a point 42, where the curved lines 38 and 40 as well as the trailing edge 18 run together. The attachment ends at another point 44 where the curved lines 38 and 40 and the trailing edge 18 run together one more time. The point 42 forms the blade-root-side end of the attachment 20. The point 44 forms the blade-tip-side end of the attachment 20. At 46, the remaining components of the rotor blade have a thick trailing edge, i.e. in this area the trailing edge of the remaining components of the rotor blade is formed by a surface lying mainly perpendicular to the direction of flow. However, in the area of attachment 20, this surface does not form the trailing edge 18 of the rotor blade, which is formed by attachment 20.

Rather than with the help of an attachment 20, the rotor blade geometry according to the invention can already be taken into consideration in the design of a new rotor blade. In this case, for example, the upper and lower shells respectively can be produced as one piece with a suction side addition portion 34 and a pressure side addition portion 36.

FIG. 4 shows another perspective view of the rotor blade portion in FIG. 3. Particularly well discernible is the blade-root-side part of the suction side addition portion 34, which tapers off acutely in point 42, which marks the blade-root-side end of the attachment 20. Also discernible is that the curved line 38, which marks the transition of the suction side addition portion 34 into the parts of the suction side 30 formed by the remaining components of the rotor blade, is arranged relatively far back with respect to the profile depth. It is located clearly behind the location of the maximum thickness of the profile at each longitudinal position of the rotor blade.

In the top view in FIG. 5, the trailing edge 18 of the rotor blade is visible. If it is formed by the attachment 20, the suction side addition portion 34 leading to the trailing edge 18 runs perpendicular to the drawing plane so that it disappears behind the trailing edge 18. The pressure side addition portion 36 on the other hand is well visible. Also visible is the blade-root-side end of the attachment 20 at point 42 and the blade-tip-side end of the attachment 20 at point 44. In the representation in FIG. 5, the drawing plane runs perpendicular to the rotor plane, wherein a pitch angle of the rotor blade is assumed according to the pitch angle optimized for the partial load operation. The drawn-in angle $\alpha_1$ is measured in the drawing plane, i.e. in a plane arranged perpendicular to the rotor plane and parallel to the longitudinal axis of the rotor blade. It is defined between the rotor plane, the direction of which is indicated by 48, and the tangential plane 50. The tangential plane 50 is applied to the pressure side, namely to the trailing edge 18 at the third cross-section 24, i.e. mainly at point 42. The angle $\alpha_1$ advantageously lies in a range from 30° to 90°. In the exemplary embodiment shown, it is approximately 45°.

FIG. 6 shows the same view as FIG. 5; however, the progression of the trailing edge 18 is highlighted. In the projection on the shown drawing plane, i.e. on a plane arranged perpendicular to the rotor plane and parallel to the longitudinal axis of the rotor blade, the trailing edge 18 rises starting from the blade tip 10 at first in a strictly monotonic manner until it reaches its highes point at a second cross-section 52 and then falls towards the blade root 12 down to the third cross-section 24 in a strictly monotonic manner. Between the second cross-section 52 and the third cross-section 24, the progress of the trailing edge 18 and thus the alignment of the profile chord do not follow the direction of flow, which turns continuously further towards the direction of the rotor axis. A trailing edge following this turning direction of flow would approximately take the progress shown by 54, as is the case for example with the rotor blade known from the document WO 2004/097215 A1 discussed above.

FIG. 7 shows another top view of the portion of the rotor blade according to the invention shown in the previous figures. The drawing plane is the rotor plane, wherein again a pitch angle according to the value optimized for the partial load operation is assumed. The view focuses on the pressure side 32 of the rotor blade. Well discernible is the longitudinal portion 26, in which the profile depth of the rotor blade is constant.

The drawn-in angle $\alpha_2$ is measured in the drawing plane, i.e. in the rotor plane. It is defined between the longitudinal axis of the rotor blade, which runs parallel to the line 56, and the projection of the tangent 58 on the trailing edge of the rotor blade at the third cross-section 24 onto the rotor plane. The angle $\alpha_2$ advantageously lies in a range from 25° to 90°. In the exemplary embodiment shown, the angle $\alpha_2$ is approximately 45°. In contrast to a conventional rotor blade in accordance with FIG. 2, the trailing edge 18 flows into the cylindrical, blade-root-side portion of the rotor blade forming an angle rather than a continuously differentiable curve in the area of the third cross-section 24.

FIG. 8 clarifies in particular the sectional planes selected for FIGS. 9 through 19 based on a top view of the suction side 32. The cross-sections shown in these figures mainly cover the longitudinal portion of the rotor blade provided with the attachment 20 where the rotor blade has a special profile. The cross-section in FIG. 9 runs along the longitudinal position of the already explained third cross-section 24, i.e. on the blade-root-side end of the attachment 20. The other cross-sections in FIGS. 10 through 19 have an increasing distance from the blade root, wherein the cross-section in FIG. 19 is arranged near the blade-tip-side end of the attachment 20, i.e. near point 44. At point 44, where the attachment 20 and thus the longitudinal portion of the rotor blade with the special profile end, the relative profile thickness is 60% or less. Point 44 is spaced from the blade root 12 at a distance of 10% or more of the rotor blade length.

The longitudinal portion of the rotor blade with the special profile begins at the third cross-section 24 at a distance from the blade root 12 of at least 0.5 meters, in the example at a distance of approximately 1 meter. The curved line 38 where the suction side addition portion 34 merges into the parts of the suction side 30 formed by the other components of the rotor blade is also visible in FIG. 8.

The features of the special profile in the area of the named longitudinal portion are first explained based on FIG. 11. In the cross-section in FIG. 11, the positions are sown of the longitudinal axis 60 of the rotor blade is approximately in the middle of the shown cross-section and of the trailing edge 18. Trailing edge 18 and longitudinal axis 60 are connected together by a straight line 62. The leading edge 16 of the rotor blade is marked in the cross-section by a cross. Also drawn in is the front stagnation point 64 of the profile and the designed direction of flow 66, which is indicated by a line pointing to the front stagnation point 64. The rotor plane 68 is also drawn in as the reference plane. The rotor plane 68 includes the longitudinal axis 60 and is aligned perpendicular to the dashed-line rotor axis 70. It is understood that the rotor axis 70 lies outside the shown sectional plane.

The profile shown in FIG. 11 has a convex suction side portion 72, which extends from the leading edge 16 up to a suction-side kink point 74. A suction side addition portion 76 runs in a straight line from the kink point 74 to the trailing edge 18. The pressure side of the profile is formed by a convex pressure side portion 78, which extends from the leading edge 16 up to a pressure-side inflection point 80, and by a concave pressure side addition portion 82, which extends from the pressure-side inflection point 80 up to the trailing edge 18.

A tangent applied to the concave pressure side addition portion 82 in the area of the trailing edge 18 is mainly aligned in the direction of the rotor plane 68. The suction side addition portion 76 also runs in the direction of the rotor plane 68. An acute angle is formed between the ends of the suction side addition portion 76 and the pressure side addition portion 82 adjacent to the trailing edge 18.

The angle $\alpha_3$ is defined between the rotor plane 68 as reference plane and the straight line 62. The position of the trailing edge 18 in the cross-section is described by angle $\alpha_3$.

The named features also exist in the remaining cross-sections in FIGS. 9 through 19 and are designated with the same reference numerals. The profile chord 84, which runs from the leading edge 16 to the trailing edge 18, is also drawn in FIG. 12. The projection of the pressure-side inflection point 80 on the profile chord 84 is also shown. The distance 86 of the pressure-side inflection point 80 from the leading edge 16 designated 86 and measured along the profile chord 84 is approximately 75% of the profile depth at the longitudinal position of the rotor blade shown in FIG. 12.

The angle $\alpha_3$ assumes approximately the following values at the longitudinal positions of the cross-sections shown in FIGS. 9 through 19: FIG. 9: −22.5°, FIG. 10: −2°, FIG. 11: 8°, FIG. 12: 13°, FIG. 13: 15.5°, FIG. 14: 16°, FIG. 15: 12°, FIG. 16: 7°, FIG. 17: 3.5°, FIG. 18: 2°, FIG. 19: 0°. The angle $\alpha_3$ thus assumes a maximum approximately at the longitudinal position of the cross-section in FIG. 14. This longitudinal position corresponds with the second cross-section 52. Starting from a longitudinal position (not shown) near the blade tip, the angle $\alpha_3$ increases in a strictly monotonic manner towards the blade root up to the longitudinal position of the second cross-section 52, reaches a maximum at the second cross-section 52 and then decreases in a strictly monotonic manner up to the third cross-section 24.

The cross-section in FIG. 19 is located at a longitudinal position of the rotor blade near the blade-tip-side end of the attachment 20. In this position, the relative profile thickness is approximately 50%.

In FIGS. 17, 18 and 19, the "thick trailing edge" of the remaining components of the rotor blade is also visible and designated with reference number 46. It is to be differentiated from the trailing edge 18 of the rotor blade.

In FIG. 20, the cross-sections in FIGS. 9 through 19 are shown with superimposed longitudinal axis 60. In this representation, the transition from an almost circular cross-section, as shown in FIG. 9, to the cross-section in FIG. 19, which already mainly corresponds with an airfoil-like, aerodynamic profile, is visible. Also discernible is the designed direction of flow 66 turning with decreasing distance from the blade root further in the direction of the rotor axis 70. This turning of the designed direction of flow 66 is shown by arrow 85. Furthermore, the curved progression of the trailing edge 18, which reaches a maximum in the cross-section in FIG. 14, can be gathered from the representation in FIG. 20.

FIG. 21 shows in a cross-sectional plane the air flow forming around the rotor blade during operation. Well discernible is the front stagnation point 64 where the air separates into a part flowing over the suction side and one flowing over the pressure side. The flow lies close to the profile in the area of the pressure side. On the trailing edge 18, it flows smoothly in the direction of the rotor plane, again at the pitch angle optimized for partial load operation. Above the straight-line suction side addition portion 76, beginning approximately from the point 86 of the convex suction side portion 72, there are flow separations and a turbulent area 88 forms. The dividing streamline 90 separates the turbulent area 88 from the flow progressing again in a laminar manner at a greater distance from the suction side addition portion 76 in area 92. The divided streamline 90 progresses almost parallel to the suction side addition portion 76 and to the rotor plane.

FIG. 22 shows a cross-section of another exemplary embodiment of a rotor blade. The cross-section has the already explained features, which are designated with the same reference numerals as in the first exemplary embodiment. The attachment 20, which has the suction side addition portion 76 and the pressure side addition portion 82, is formed by a shell-like component. The shell-like component has an even thickness so that the suction side addition portion 76 and the pressure side addition portion 82 are located at a constant distance from each other. The transition from the attachment 20 to the remaining components of the rotor blade runs on the pressure-side inflection point 80 with a continuous curvature, on the suction-side kink point 74 forming an inward pointing kink.

This completes the description of the preferred and alternate embodiments of the invention. Those skilled in the art may recognize other equivalents to the specific embodiment described herein which equivalents are intended to be encompassed by the claims attached hereto.

What is claimed is:

1. A wind turbine rotor blade comprising a blade tip (10), a blade root (12), a leading edge (16), a trailing edge (18), a pressure side (32), a suction side (30) and a cross-section, which changes from the blade tip (10) to the blade root (12), wherein the cross-section in the middle (14) of the rotor blade is formed by an aerodynamic profile and is mainly circular at the blade root (12), and wherein the cross-section in a longitudinal portion of the rotor blade, the longitudinal portion being arranged between the blade root (12) and the middle (14) of the rotor blade, comprises:
   a convex pressure side portion (78), which extends from the leading edge (16) up to a pressure-side inflection point (80),
   a concave pressure side addition portion (82), which connects with the pressure-side inflection point (80) with a continuous curvature and extends up to the trailing edge (18),
   a convex suction side portion (72), which extends from the leading edge (16) up to a suction-side kink or inflection point (74),
   a suction side addition portion (76), which extends from the suction-side kink or inflection point (74) up to the trailing edge (18), and wherein the kink or inflection point (74) is formed such that if one follows a progression of a curve defined by the convex suction side portion (72) and the suction side addition portion (76) from the leading edge (16) up to the kink or inflection point (74), a direction of the curve changes at the kink or inflection point (74) towards an outside of the cross-section.

2. The wind turbine rotor blade according to claim 1, wherein a distance from the pressure-side inflection point (80) to the leading edge (16), measured along the profile chord (84), is more than 60% of a profile depth.

3. The wind turbine rotor blade according to claim 1, wherein the suction side addition portion (76) is mainly straight.

4. The wind turbine rotor blade according to claim 1, wherein a tangent lies against the pressure side addition portion (82) at the trailing edge (18) mainly in a rotor plane when the rotor blade is arranged with reference to the rotor plane at a pitch angle optimized for partial load operation.

5. The wind turbine rotor blade according to claim 1, wherein a tangent lies against the suction side addition portion (76) at the trailing edge (18) mainly in a rotor plane when the rotor blade is arranged with reference to the rotor plane at a pitch angle optimized for partial load operation.

6. The wind turbine rotor blade according to claim 1, wherein an acute angle is formed between the pressure side addition portion (82) and the suction side addition portion (76) at the trailing edge (18).

7. The wind turbine rotor blade according to claim 1, wherein the longitudinal portion begins at a distance from the blade root (12).

8. The wind turbine rotor blade according to claim 1, wherein the longitudinal portion extends up to a distance from the blade root (12), in which the cross-section has a relative profile thickness of 60% or less.

9. The wind turbine rotor blade according to claim 1, wherein the longitudinal portion extends up to a distance of 10% or more of a rotor blade length from the blade root (12).

10. The wind turbine rotor blade according to claim 1, wherein the rotor blade has a constant profile depth between a first distance of 10% of a rotor blade length from the blade root (12) and a second distance of 15% of the rotor blade length from the blade root (12).

11. The wind turbine rotor blade according to claim 1, wherein the pressure side addition portion (82) and the suction side addition portion (76) are formed by an attachment (20), which is connected with the remaining components of the rotor blade.

12. The wind turbine rotor blade according to claim 11, wherein remaining components of the rotor blade at a longitudinal position (22) of the rotor blade have a maximum profile depth, wherein the attachment (20) begins at this longitudinal position (22) and extends from there in the direction towards the blade root (12).

13. The wind turbine rotor blade according to claim 11, wherein remaining components of the rotor blade at a longitudinal position (22) of the rotor blade have a maximum profile depth, wherein the attachment (20) begins at a greater distance from the blade root (12) than this longitudinal position (22) and extends from there in the direction towards the blade root (12) and the profile depth of the rotor blade is enlarged by the attachment (20) above and beyond the maximum profile depth of the remaining components at least in a longitudinal portion.

14. The wind turbine rotor blade according to claim 11, wherein the attachment (20) is subdivided into several segments.

15. The wind turbine rotor blade according to claim 11, wherein the attachment (20) is formed by a shell-like component made of a curved jacket with even thickness.

* * * * *